United States Patent
Tsai

(10) Patent No.: US 8,926,102 B2
(45) Date of Patent: Jan. 6, 2015

(54) SAFETY PROTECTION METHOD FOR LASER PROJECTION APPARATUS

(71) Applicant: Lite-On IT Corporation, Taipei (TW)

(72) Inventor: Yu-Nan Tsai, Hsinchu (TW)

(73) Assignee: Lite-On Technology Corporation, Taipei (TW)

( * ) Notice: Subject to any disclaimer, the term of this patent is extended or adjusted under 35 U.S.C. 154(b) by 199 days.

(21) Appl. No.: 13/648,454

(22) Filed: Oct. 10, 2012

(65) Prior Publication Data

US 2014/0063475 A1    Mar. 6, 2014

(30) Foreign Application Priority Data

Sep. 4, 2012   (CN) .......................... 2012 1 0322543

(51) Int. Cl.
   *G03B 21/00*   (2006.01)
(52) U.S. Cl.
   USPC ................ 353/121; 353/30; 353/31; 353/85; 353/94; 353/99
(58) Field of Classification Search
   USPC ............... 353/30, 31, 37, 39, 85, 94, 99, 121; 372/8, 29.011, 38.01, 38.09; 359/199.1, 199.2
   See application file for complete search history.

(56) References Cited

U.S. PATENT DOCUMENTS

| | | | |
|---|---|---|---|
| 8,427,590 B2 * | 4/2013 | Raring et al. ................. | 348/744 |
| 8,696,142 B2 * | 4/2014 | Osaka et al. ................... | 353/85 |
| 8,746,898 B2 * | 6/2014 | Miller et al. ................... | 353/99 |
| 2007/0041068 A1 * | 2/2007 | Heminger et al. ............ | 359/199 |
| 2007/0242229 A1 * | 10/2007 | Kim et al. ....................... | 353/31 |
| 2008/0144150 A1 * | 6/2008 | Champion et al. ............ | 359/199 |
| 2012/0218525 A1 * | 8/2012 | Kwon et al. ................... | 353/85 |
| 2013/0003026 A1 * | 1/2013 | Rothaar ........................ | 353/85 |

* cited by examiner

*Primary Examiner* — Sultan Chowdhury
(74) *Attorney, Agent, or Firm* — McClure, Qualey & Rodack, LLP

(57) ABSTRACT

A safety protection method for a laser projection apparatus is provided. The laser scanning apparatus includes a laser source, a laser source driver, a scanning mirror, and a light-outputting port. The laser source driver is configured to drive the laser source to emit a laser beam. The safety protection method includes the following steps. Firstly, after the laser projection apparatus is powered on, an optical path of the laser beam is adjusted, so that the laser beam is not ejected out from the light-outputting port. Then, the laser source driver is disabled. Then, a judging step is performed to judge whether an intensity of the laser beam is higher than a threshold level. If the intensity of the laser beam is higher than the threshold level, the laser source is turned off.

15 Claims, 2 Drawing Sheets

SAFETY PROTECTION METHOD FOR LASER PROJECTION APPARATUS

This application claims the benefit of People's Republic of China application Serial No. 201210322543.6, filed Sep. 4, 2012, the subject matter of which is incorporated herein by reference.

FIELD OF THE INVENTION

The present invention relates to a safety protection method, and more particularly to a safety protection method for a laser projection apparatus.

BACKGROUND OF THE INVENTION

As known, a laser source has a narrower emission spectrum than a LED source. The use of the laser source in a projection apparatus is able to result in better color purity and create vivid images with extensive color coverage. With increasing development of the information generation, laser projection apparatuses with the portable and easy-to-use benefits are widely used in conferences, offices, schools and homes. For example, a pico projector is one of the most popular laser scanning projection apparatuses.

Due to the above advantages and benefits, laser projection apparatuses are gradually adopted. However, if the user is exposed to the surroundings of a laser projection apparatus for a long time, the laser radiation energy may cause injury to the user. For example, the exposure of the laser beam may hurt the user's eyes or skin. For protecting the user from the risk of the laser beam, the safety regulations of the laser products in the world become stringent increasingly. For example, the national standard IEC-60825-1 is the safety standard of laser products emitting laser radiation. According to the safety regulations, the exposure radiation energy of the laser products in the normal condition and the single fault condition should be lower than the accessible emission limit.

FIG. 1 schematically illustrates the architecture of a conventional laser projection apparatus in a normal working mode. As shown in FIG. 1, the conventional laser projection apparatus 1 comprises a laser diode driver (LDD) 11, a laser diode (LD) 12, a reflective mirror 13, a scanning mirror 14, an optical sensor 15, and a controlling unit 16. These components are accommodated within a casing 10. The laser diode driver 11 is configured to issue a driving signal Sd. In response to the driving signal Sd, the laser diode 12 is driven to emit a laser beam 121. When the laser beam 121 is reflected by the reflective mirror 13, the laser beam 121 is directed to the scanning mirror 14. For example, the scanning mirror 14 is a two-dimensional microelectromechanical (MEMS) scanning mirror.

When the laser beam 121 is reflected by the scanning mirror 14, the laser beam 121 is transmitted through a light-outputting port 101 of the casing 10 to be projected on a projection surface (not shown) according to a raster scanning trajectory or a Lissajous scanning trajectory. Moreover, the optical sensor 15 is used for detecting the laser beam 121 which is reflected by the reflective mirror 13, and outputting a corresponding sensing signal S1 to the controlling unit 16. According to the difference between the sensing signal S1 and a predetermined laser signal S0, the controlling unit 16 issues a control signal Sc to the laser diode driver 11. According to the control signal Sc, the laser beam 121 is correspondingly adjusted and compensated.

In practice, for simulating the single fault condition, the laser diode driver 11 is connected to a ground terminal to disable the laser diode driver 11. Under this circumstance, the laser beam 121 from the laser diode 12 has the maximum power. For protecting the user's eyes or skin from injury of the strong laser beam 121, the laser projection apparatus 1 should have a special safety device or take a special protection measure such as a remote controlling mechanism or an interlocking mechanism.

Therefore, there is a need of providing a safety protection method for a laser projection apparatus. By using the safety protection method, the laser projection apparatus can pass the single fault test of the laser product.

SUMMARY OF THE INVENTION

The present invention provides a safety protection method for a laser projection apparatus. By using the safety protection method, the laser projection apparatus can pass the single fault test of the laser product.

An embodiment of the present invention provides a safety protection method for a laser projection apparatus. The laser scanning apparatus includes a laser source, a laser source driver, a scanning mirror, and a light-outputting port. The laser source driver is configured to drive the laser source to emit a laser beam. The safety protection method includes the following steps. Firstly, after the laser projection apparatus is powered on, an optical path of the laser beam is adjusted, so that the laser beam is not ejected out from the light-outputting port. Then, the laser source driver is disabled. Then, a judging step is performed to judge whether an intensity of the laser beam is higher than a threshold level. If the intensity of the laser beam is higher than the threshold level, the laser source is turned off.

An embodiment of the present invention provides a safety protection method for a laser projection apparatus. The laser scanning apparatus includes a laser source, a laser source driver, a scanning mirror, and a light-outputting port. The laser source driver is configured to drive the laser source to emit a laser beam. The safety protection method includes the following steps. Firstly, the scanning mirror is rotated to a position where an optical path of the laser beam is not aligned with the light-outputting port after the laser projection apparatus is powered on. Then, a judging step is performed to judge whether an intensity of the laser beam is higher than a threshold level. If the intensity of the laser beam is higher than the threshold level, a warning prompt is generated.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

Figure 1:
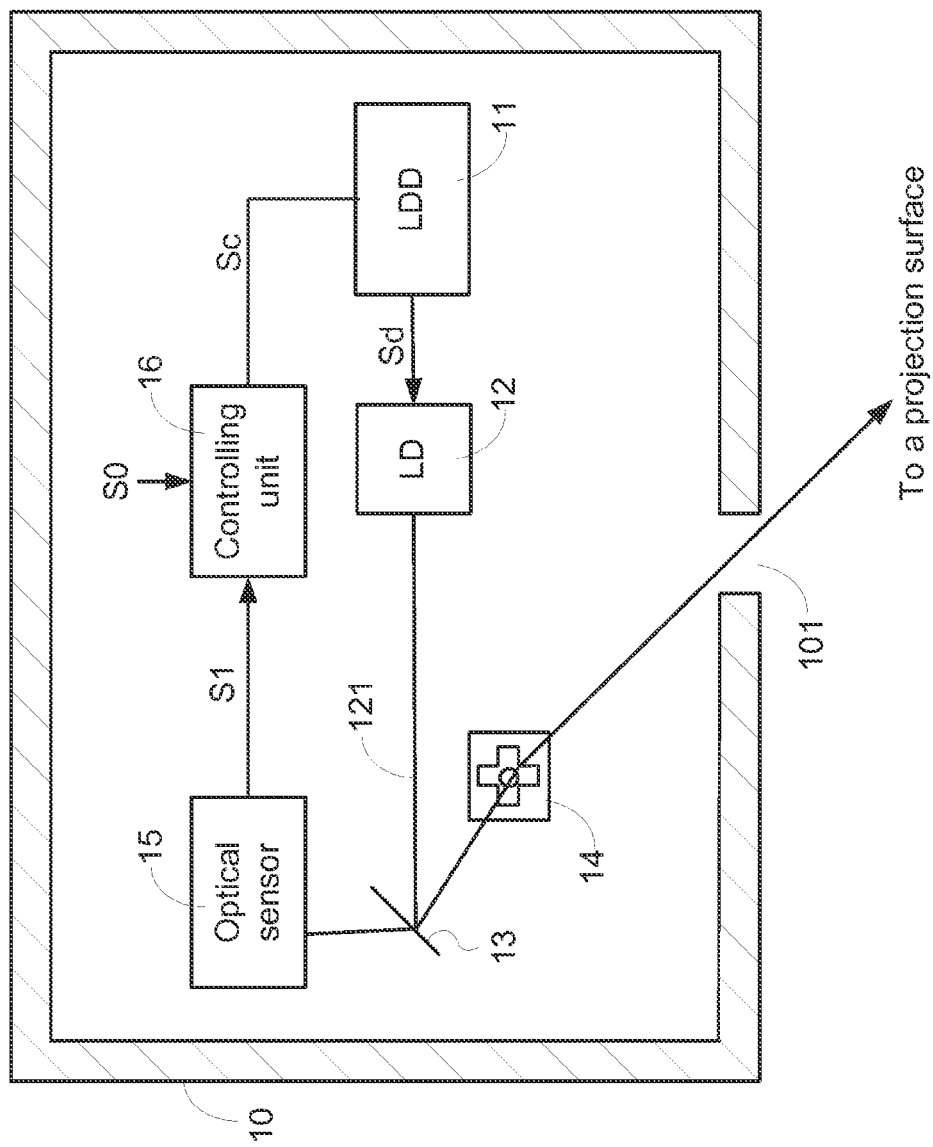
FIG. 1 schematically illustrates the architecture of a conventional laser projection apparatus in a normal working mode.

The present invention will now be described more specifically with reference to the following embodiments. It is to be noted that the following descriptions of preferred embodiments of this invention are presented herein for purpose of illustration and description only. In the following embodiments and drawings, the elements irrelevant to the concepts of the present invention are omitted and not shown. For well understanding the present invention, the elements shown in the drawings are not in scale with the elements of the practical product.

Figure 2:
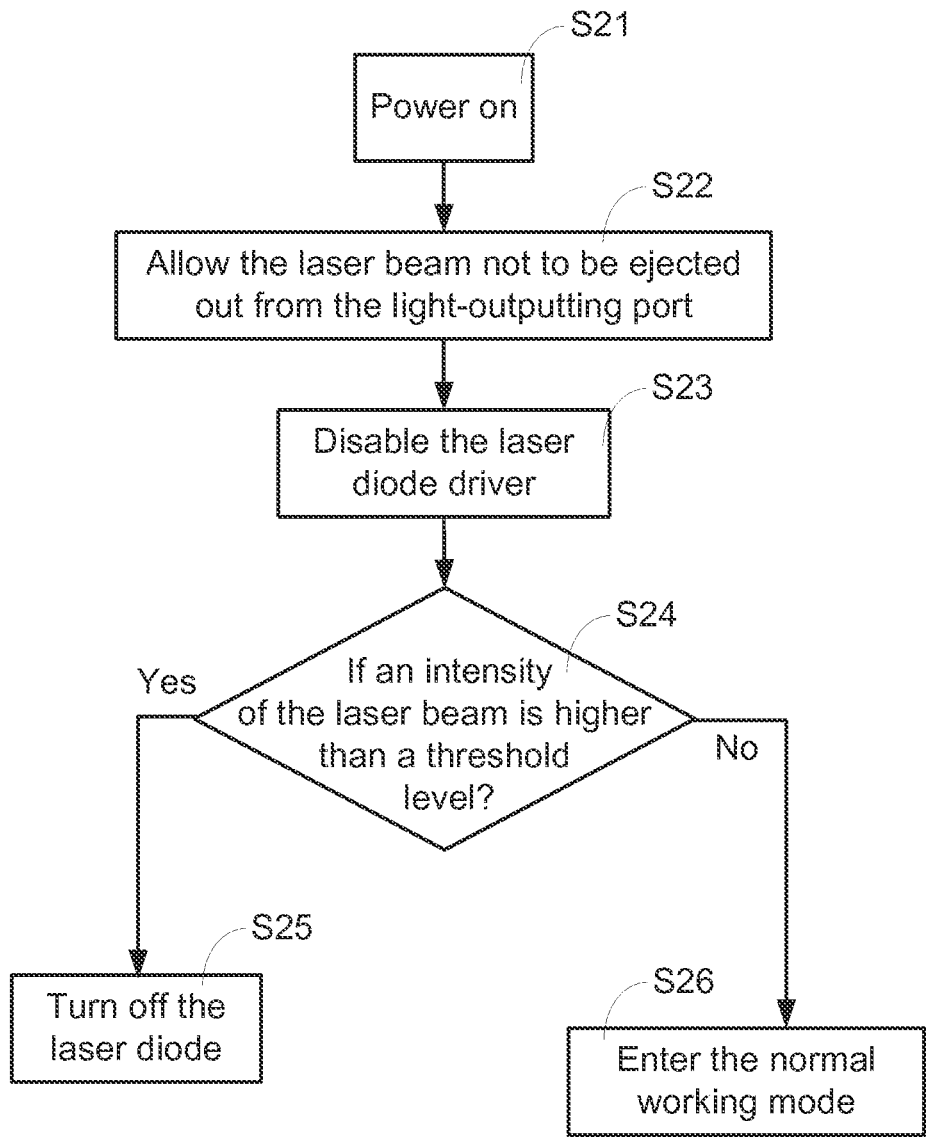
FIG. 2 is a flowchart illustrating a safety protection method for a laser scanning projection apparatus according to an embodiment of the present invention.

The present invention provides a safety protection method for a laser projection apparatus. FIG. 2 is a flowchart illustrating a safety protection method for a laser scanning projection apparatus according to an embodiment of the present invention. The architecture of the laser scanning projection apparatus is similar to that of FIG. 1, and is not redundantly described herein. Hereinafter, the safety protection method will be illustrated with reference to FIGS. 1 and 2.

Firstly, in the Step S21, the laser scanning projection apparatus 1 is powered on. Then, in the step S22, the optical path of the laser beam 121 is adjusted by the controlling unit 16, so that the laser beam 121 is not ejected out from the light-outputting port 101. For example, in a case that the scanning mirror 14 is rotated to a position where the optical path of the laser beam 121 is not aligned with the light-outputting port 101, the laser beam 121 is not ejected out from the light-outputting port 101.

Then, in the Step S23, the laser diode driver 11 is disabled by the controlling unit 16 in order to further judge whether the laser diode 12 is normally operated or not.

Then, according to an intensity of the laser beam 121 which is detected by the optical sensor 15, the controlling unit 16 will judge whether the intensity of the laser beam 121 is higher than a threshold level or not (Step S24). Moreover, according to the intensity of the laser beam 121, the controlling unit 16 may determine whether the laser scanning projection apparatus 1 enters the normal working mode or not. If the intensity of the laser beam 121 is higher than the threshold level, it means that the laser diode 12 is not normally operated. Consequently, the laser diode 12 is turned off (Step S25). Optionally, a warning prompt (e.g. a warning light signal or a warning sound) may be emitted to notify the user that the laser scanning projection apparatus 1 needs to be repaired.

In the single fault condition that the laser diode driver 11 or the laser diode 12 is abnormal, the safety protection method of the present invention is effective to protect the user from the risk of the laser beam 121. By the safety protection method of the present invention, the scanning mirror 14 is firstly rotated to the position where the optical path of the laser beam 121 is not aligned with the light-outputting port 101. Under this circumstance, even if the laser diode driver 11 or the laser diode 12 is abnormal, the laser beam 121 is not ejected out from the light-outputting port 101. Then, the intensity of the laser beam 121 is detected. If the intensity of the laser beam 121 is higher than the threshold level, the laser diode 12 is turned off, so that, the user may be protected from the risk of the laser beam 121. In other words, by using the safety protection method of the present invention, the laser scanning projection apparatus 1 can pass the single fault test of the laser product.

On the other hand, if the intensity of the laser beam 121 is lower than the threshold level in the step S24, it means that the laser diode 12 is normally operated. Consequently, the laser projection apparatus is operated in the normal working mode (Step S26). The operations of the laser projection apparatus in the normal working mode are well known in the art, and are not redundantly described herein.

Moreover, the safety protection method of the present invention may be implemented immediately after the laser projection apparatus is powered on. That is, after the laser projection apparatus is powered on, the scanning mirror is rotated to the position where the optical path of the laser beam is not aligned with the light-outputting port. Under this circumstance, even if the laser diode driver or the laser diode is abnormal and the laser beam from the laser diode has the maximum power, the laser beam is not ejected out from the light-outputting port to hurt the user's eyes or skin. Moreover, after the abnormal condition of the laser diode driver or the laser diode is confirmed, the laser diode is turned off. Consequently, the purpose of protecting the user will be achieved. Moreover, in a case that the laser diode driver and the laser diode are normal, the laser projection apparatus is operated in the normal working mode in order to assure the safety of the laser projection apparatus.

From the above descriptions, the present invention provides a safety protection method for a laser projection apparatus. Before a procedure of judging whether the intensity of the laser beam is abnormal, the scanning mirror is rotated to the position where the optical path of the laser beam is not aligned with the light-outputting port. Under this circumstance, even if the laser diode driver or the laser diode is abnormal, the laser beam is not ejected out from the light-outputting port to hurt the user's eyes or skin.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A safety protection method for a laser projection apparatus, the laser projection apparatus comprising a laser source, a laser source driver, a scanning mirror and a light-outputting port, the laser source driver being configured to drive the laser source to emit a laser beam, the safety protection method comprising steps of:
    rotating the scanning mirror to a position where a reflected laser beam reflected from the scanning mirror of the laser beam is not aligned with the light-outputting port after the laser projection apparatus is powered on;
    disabling the laser source driver; and
    judging whether an intensity of the laser beam is higher than a threshold level, wherein if the intensity of the laser beam is higher than the threshold level, the laser source is turned off.

2. The safety protection method as claimed in claim 1, wherein if the intensity of the laser beam is lower than the threshold level, the laser projection apparatus is operated in a normal working mode.

3. The safety protection method as claimed in claim 1, wherein the laser source is a laser diode, and the laser source driver is a laser diode driver.

4. The safety protection method as claimed in claim 1, wherein the scanning mirror is a two-dimensional MEMS scanning mirror.

5. The safety protection method as claimed in claim 1, wherein the laser projection apparatus is a pico projector.

6. The safety protection method as claimed in claim 1, wherein the laser projection apparatus further comprises an optical sensor for detecting the intensity of the laser beam.

7. The safety protection method as claimed in claim 1, wherein the laser projection apparatus further comprises a controlling unit for judging whether the intensity of the laser beam is higher than the threshold level or not.

8. A safety protection method for a laser projection apparatus, the laser projection apparatus comprising a laser source, a laser source driver, a scanning mirror and a light-outputting port, the laser source driver being configured to drive the laser source to emit a laser beam, the safety protection method comprising steps of:

rotating the scanning mirror to a position where a reflected laser beam reflected from the scanning mirror of the laser beam is not aligned with the light-outputting port after the laser projection apparatus is powered on; and judging whether an intensity of the laser beam is higher than a threshold level, wherein if the intensity of the laser beam is higher than the threshold level, a warning prompt is generated.

9. The safety protection method as claimed in claim 8, wherein if the intensity of the laser beam is lower than the threshold level, the laser projection apparatus is operated in a normal working mode.

10. The safety protection method as claimed in claim 8, wherein the laser source is a laser diode, and the laser source driver is a laser diode driver.

11. The safety protection method as claimed in claim 8, wherein the scanning mirror is a two-dimensional MEMS scanning mirror.

12. The safety protection method as claimed in claim 8, wherein the laser projection apparatus is a pico projector.

13. The safety protection method as claimed in claim 8, wherein the laser projection apparatus further comprises an optical sensor for detecting the intensity of the laser beam.

14. The safety protection method as claimed in claim 8, wherein the laser projection apparatus further comprises a controlling unit for judging whether the intensity of the laser beam is higher than the threshold level or not.

15. The safety protection method as claimed in claim 8, wherein if the intensity of the laser beam is higher than the threshold level, the laser source is turned off.

* * * * *